United States Patent [19]
Ueda

[11] Patent Number: 4,887,891
[45] Date of Patent: Dec. 19, 1989

[54] ZOOM LENS SYSTEM FOR USE IN MICROFILM PROJECTION APPARATUS

[75] Inventor: Toshihiko Ueda, Osaka, Japan

[73] Assignee: Minolta Camera Kabushiki Kaisha, Osaka, Japan

[21] Appl. No.: 168,662

[22] Filed: Mar. 16, 1988

[30] Foreign Application Priority Data

Mar. 20, 1987 [JP] Japan ................................ 62-64388

[51] Int. Cl.$^4$ ...................... G02B 15/14; G02B 5/04
[52] U.S. Cl. ..................................... 350/427; 350/286
[58] Field of Search .................... 350/423, 427, 286

[56] References Cited

U.S. PATENT DOCUMENTS

| 3,360,325 | 5/1964 | Gustafson | 350/427 |
| 4,232,942 | 11/1980 | Ikemori | 350/423 |

FOREIGN PATENT DOCUMENTS

| 47-35028 | 9/1972 | Japan . |
| 57-4016 | 1/1982 | Japan . |
| 57-73715 | 5/1982 | Japan . |

Primary Examiner—Scott J. Sugarman
Attorney, Agent, or Firm—Price, Gess & Ubell

[57] ABSTRACT

A zoom lens system for use in a microfilm projecting apparatus, the system consisting of a positive lens group at the enlargement side, a negative lens group at the reduction side and an aperture stop disposed in the first lens group. The positive lens group includes, from the enlargement side, a positive lens unit having at least one positive lens element, a biconcave lens element, a positive lens element and a positive compound lens unit composed of a negative lens element and a positive lens element cemented together. The negative lens group includes, from the enlargement side, a positive meniscus lens element having a concave surface on the enlargement side, a biconcave lens element and a positive lens element. The positive lens group with the aperture stop and the negative lens group are moved along the optical axis in an operation of zooming.

10 Claims, 6 Drawing Sheets spherical aberration astigmatism distortion spherical aberration astigmatism distortion spherical aberration astigmatism distortion

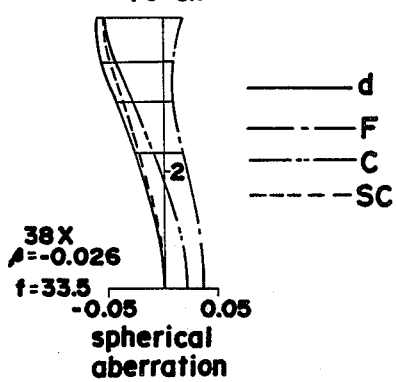
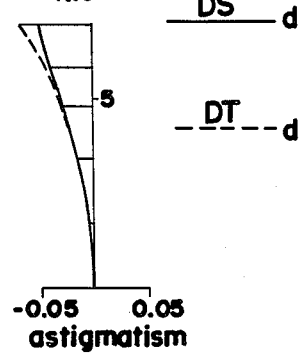
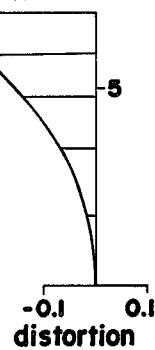
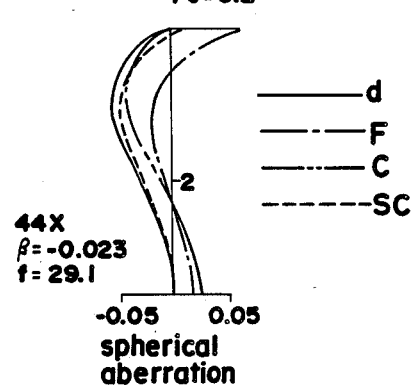
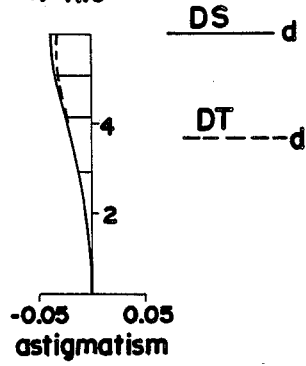
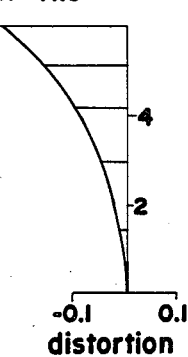
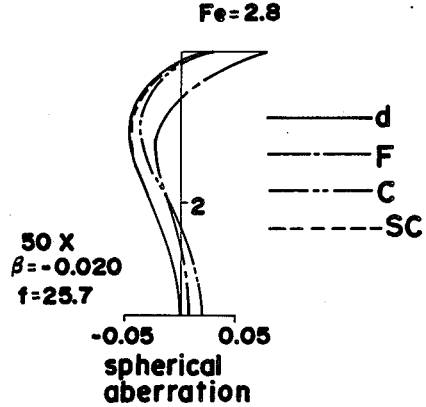
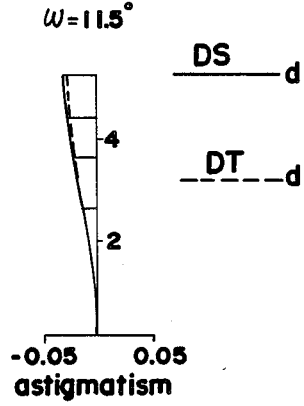
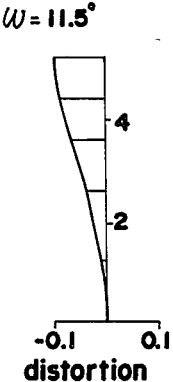

ZOOM LENS SYSTEM FOR USE IN MICROFILM PROJECTION APPARATUS

FIELD OF THE INVENTION

The present invention relates to a zoom lens system for use in microfilm projection apparatus such as microfilm readers, microfilm reader/printers and the like, and more particularly to a zoom lens system for projecting images of microfilms in a high magnification range such as 38× to 50× at a definite object-image distance.

One example of a microfilm reader is shown in FIG. 1. The image on the microfilm M, sandwiched between flat glass plates G as a film holder 1, is projected onto a screen 7 via a lens system 2, an image rotation prism 3 and mirrors 4, 5, 6. The rotation of the prism 3 rotates the image on the screen 7 without moving the film M.

In the conventional microfilm projection apparatus as shown in FIG. 1, there is used a lens system having a constant magnification. If the user wishes to project images at a different magnification, it is necessary for the user to change the presently used lens system for another lens system having a different magnification. The change of the lens system is troublesome for the user. Therefore, zoom lens systems are proposed for use in microfilm projection apparatus.

One proposal is shown in Japanese Laid-Open patent application No. 57-73715 which discloses a zoom lens system having first, second and third lens groups and an aperture stop disposed between the second and third lens groups. This lens system has a drawback in that the light amount varies greatly on the screen according to the zooming operation, so that the user has a disagreeable feeling. The above-mentioned drawback will be explained hereinafter. Considering a model of a lens system having a first lens group and a second lens group movable along an optical axis by zooming and an aperture stop disposed adjacent to the second lens group, an effective F number of the enlargement side is determined by the size of the entrance pupil viewed from the enlargment side, namely, the size of a virtual image V of the stop S viewed through the first lens group from the enlargement side. The effective F number is proportionally represented by the following expression:

$$\frac{1}{2 \sin U}$$

where U is the half angle of spread of on-axis light flux. Zooming movement of the first lens group causes a larger alteration of the effective F number since the half angle U and also the radius and position of the virtual image of the stop S are largely altered.

U.S. Pat. No. 3,360,325 discloses a zoom lens system having an image rotation prism therein. The image rotation prism, which is a Dove prism in this patent, causes aberrations to the whole lens system, so that it is necessary for the correction of the aberrations to increase the number of lenses. Furthermore, the zoom lens system of the U.S. Patent has the same drawback as Japanese Laid-Open patent application No. 57-73715 since an aperture stop is disposed between movable lens groups.

SUMMARY OF THE INVENTION

Accordingly, an object of the present invention is to provide an improved zoom lens system for projecting images of microfilms at a definite object-image distance.

Another object of the present invention to be provide a zoom lens system which is clear and has a smaller effective F number for realizing a high resolving power irrespective of zooming movement.

Still another object of the present invention is to be provide a zoom lens system which is compact and suited to an image rotation prism.

These and other objects of the present invention can be fulfilled by a zoom lens system comprising from the enlargement side to the reduction side: a first lens group so a positive refractive power including, from the enlargement side, a positive lens unit having at least one positive lens element, a biconcave lens element, a positive lens element and a positive compound lens unit composed of a negative lens element and a positive lens element cemented together; a second lens group of a negative refractive power including, from the enlargement side, a positive meniscus lens element having a concave surface on the enlargement side, a biconcave lens element and a positive lens element; and an aperture stop disposed in the first lens group; wherein the first lens group with the aperture stop and the second lens group are moved along the optical axis in an operation of zooming.

The features of the present invention which are believed to be novel are set forth with particularity in the appended claims. The present invention, both as to its organization and advantages thereof, may best be understood by reference to the following description.

BRIEF DESCRIPTION OF THE DRAWINGS

FIGS. 8a to 8c are diagrams showing aberration curves of the second embodiment at 38×;

FIGS. 9a to 9c are diagrams showing aberration curves of the second embodiment at 44×;

FIGS. 10a to 10c are diagrams showing aberration curves of the second embodiment at 50×;

DESCRIPTION OF THE PREFERRED EMBODIMENTS

The following description is provided to enable any person skilled in the optical art to make and use the invention and sets forth the best modes contemplated by the inventor of carrying out his invention. Various modifications, however, will remain readily apparent to those skilled in the art, since the generic principles of the present invention have been defined herein specifically to provide a zoom lens system.

In the accompanying drawings, the lenses in accordance with the present invention are illustrated diagrammatically. The individual lenses are designated by the letter L with a subscript number (typed as an adscript number) corresponding to the consecutive numbers of the lenses from the enlargement side to the reduction side. The radius of curvature of the lenses is indicated by r, with a subscript (adscript) number corresponding to consecutive numbers of the lenses. The axial distances, d, along the optical axis are set forth in the tables and include both the axial spacings between the lenses and the thickness of the lenses. Finally, the refractive index, N, and Abbe number, $\nu$, are provided in each of the tables.

Figure 1:
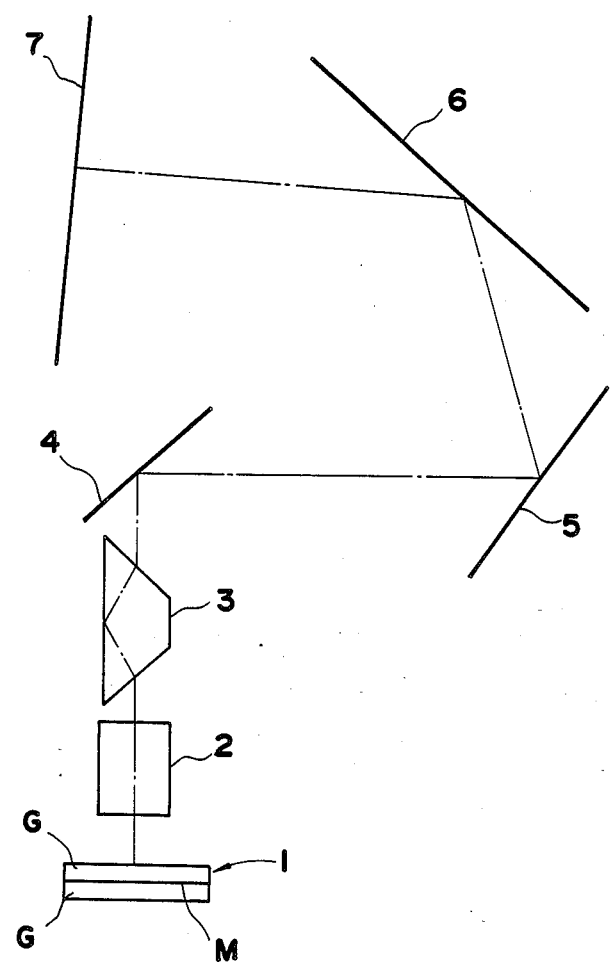
FIG. 1 is a diagram showing a microfilm reader having an image rotation prism.
Figure 2A:
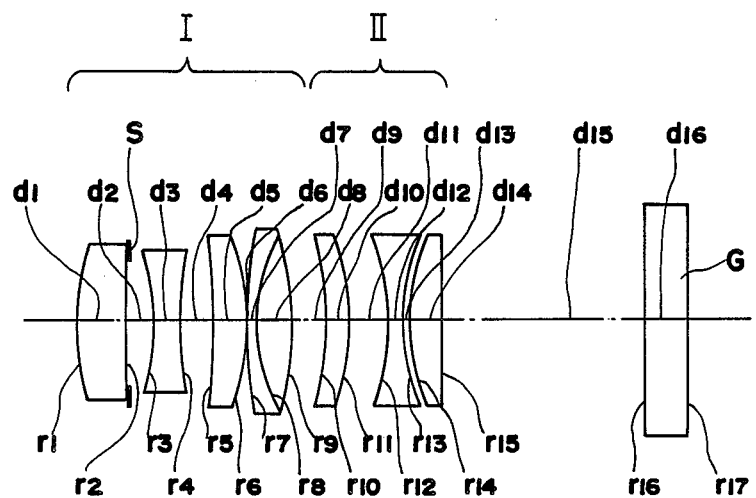
FIG. 2a is a diagram in section showing a zoom lens system embodying the present invention in the longest focal length side.
Figure 2B:
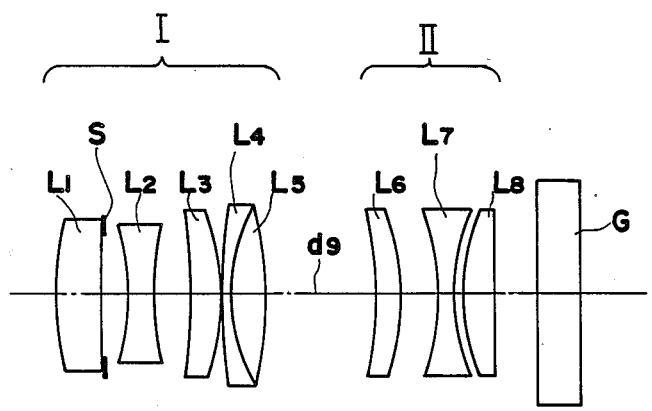
FIG. 2b is a diagram in section showing the zoom lens system in the shortest focal length side.

Referring to FIGS. 2a and 2b, a zoom lens system embodying the present invention comprises from the enlargement side to the reduction side a first lens group I and a second lens group II. An aperture stop S is disposed in the first lens group I.

The first lens group I with the stop S and the second lens group II are moved along the optical axis independently so as to give varying magnifications while keeping the object-image distance constant. More specifically, the first and second lens groups are moved to the reduction side while increasing the distance d9 therebetween during zooming from the longest focal length side to the shortest focal length side.

The zoom lens system of the present invention keeps the object-image distance constant, so that the projecting magnification can be varied in a high range such as 38× to 50× without the shift of focal point.

The first lens group I is of a positive refractive power and comprises from the enlargement side a positive lens unit having at least one positive lens L1, a biconcave lens L2, a positive lens L3 and a positive compound lens composed of a negative lens L4 and a positive lens L5 cemented together. The first lens group I is a Tessar type of posi-nega-posi or a modification thereof which is suitable for the correction of spherical aberration and coma if coordinated with the stop S near the enlargement side thereof.

The second lens group II is of a negative refractive power and comprises from the enlargement side a positive meniscus lens L6 having a concave surface on the enlargement side, a biconcave lens L7 and a positive lens L8. The second lens group II contributes to the correction of any aberrations, especially astigmatism, coma of off-axis and lateral chromatic aberration at zooming. Further, the lens L7 and L8 of the second lens group II located with an air gap d13 therebetween correct the curvature of field as to on-axis ray and off-axis ray during zooming.

The system can be compacted because of the construction which is of the telephoto type of posi-nega at the longest focal length side.

The stop S is disposed between the positive lens L1 and the biconcave lens L2, that is, near the most enlargement side of the first lens group I, so that the effective F number is kept substantially constant. Thereby, the light amount on the screen is kept constant. Additionally, the system can be combined with an image rotation prism of a compact size.

The image rotation prism is reduced in size by a fixed stop at the enlargement side of a zoom lens system, but it is more advantageous to use a stop which is movable relative to zooming movement for aberration correction in a system which has a higher magnification and a smaller pupil.

Further, the stop may be located at the most enlargement side or the most reduction side of the first lens group. The stop can be located in the area capable of keeping a variation volume of the effective F number in a usable range. Preferably, the stop is arranged at the more enlargement side than the center lens of the first lens group.

Furthermore, the stop may be movably arranged independent of the first lens group; in this case, both may be made movable as related to each other.

The zoom lens system of the present invention fulfills the conditions hereinafter described:

(1) $0.5fL < fI < 0.7fL$
(2) $-0.9fL < fII < -0.6fL$
(3) $10.0 < |rA/rB|$
(4) $0.6 < \sqrt{\nu A . \nu C}/\nu B < 0.8$ where fL: Focal length of the whole system at the longest focal length side
fI: Focal length of the first lens group
fII: Focal length of the second lens group
rA: Radius of curvature of the reduction side surface of the reduction side positive lens of the second lens group
rB: Radius of curvature of the enlargement side surface for the reduction side positive lens of the second lens group
$\nu$A: Abbe number for the enlargement side meniscus lens of the second lens group
$\nu$B: Abbe number for the biconcave lens of the second lens group
$\nu$C: Abbe number for the reduction side positive lens of the second lens group.

Conditions (1) and (2) are for keeping the size of the system in a suitable range and for obtaining an adequate Petzval sum. When the upper limit value of the condition (1) or the lower limit value of the condition (2) is exceeded, the Petzval sum becomes negative and correction for curvature of field becomes excessive. When the lower limit value of the condition (1) or the upper limit value of the condition (2) is exceeded, the movement distance of the system increases and aberration correction for keeping the diameter of light flux smaller than a suitable value at the most enlargement side of the system on the longest focal distance side becomes difficult due to the movement of the first lens group. The image rotation prism then increases in size.

Condition (3) is for corrections of coma and of astigmatic difference. In the microfilm projection apparatus, the size of the object at the enlargement side is constant, the image size varies in proportion to magnification at the reduction side. Accordingly, the diameter of light flux through the second lens group varies with zooming. Therefore, increased rB is preferable for corrections of coma and of astigmatic difference.

Condition (4) is for correction of variation of lateral chromatic aberration. When the upper limit value is exceeded, correction becomes excessive. When the lower limit value is exceeded, correction becomes insufficient.

Figure 3:
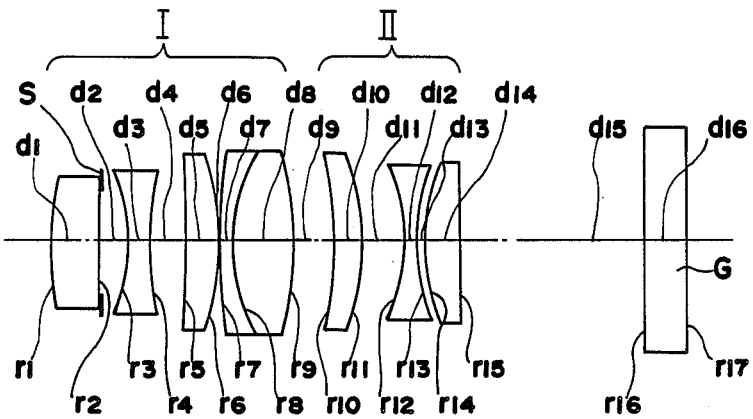
FIG. 3 is a diagram in section showing the zoom lens system of a first embodiment.
Figure 7:
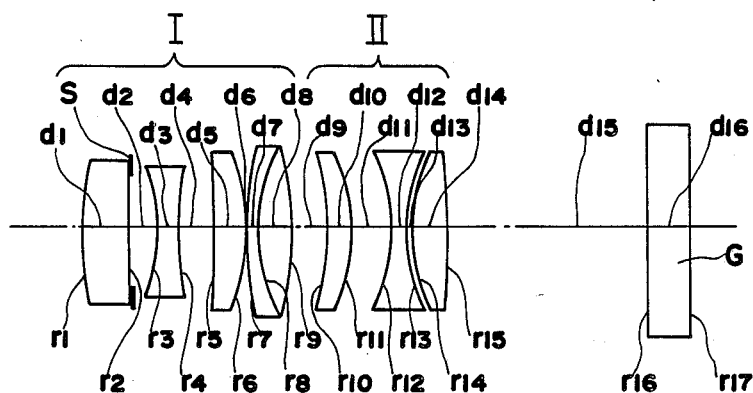
FIG. 7 is a diagram in secton showing the zoom lens system of a second embodiment.
Figure 11:
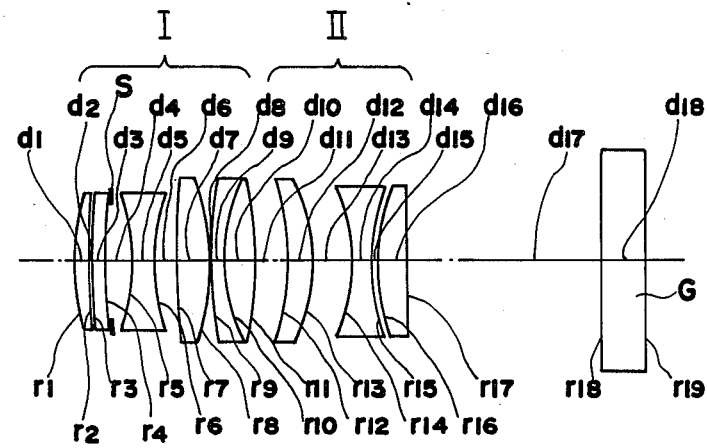
FIG. 11 is a diagram in section showning the zoom lens system of a third embodiment.
Figure 4A:
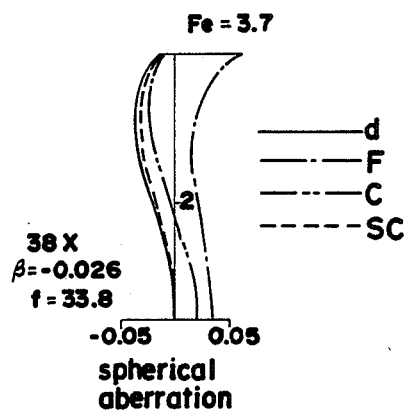
FIGS. 4a to 4c are diagrams showing aberration curves of the first embodiment at 38×.
Figure 4B:
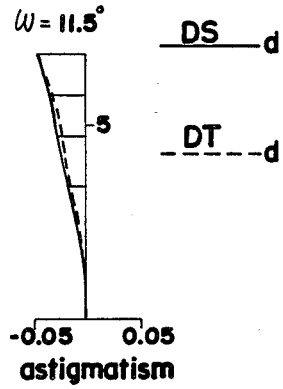
Figure 4C:
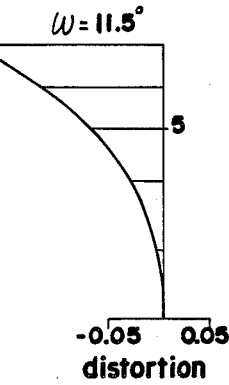
Figure 5A:
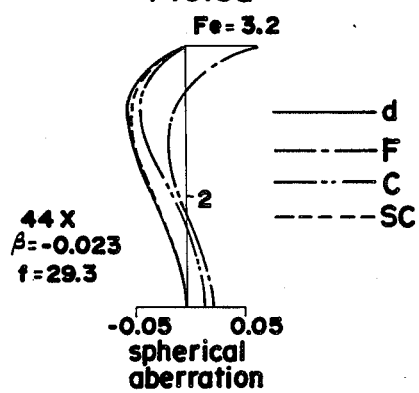
FIGS. 5a to 5c are diagrams showing aberration curves of the first embodiment at 44×.
Figure 5B:
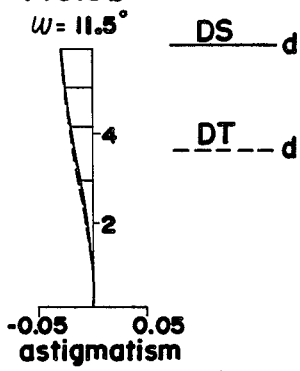
Figure 5C:
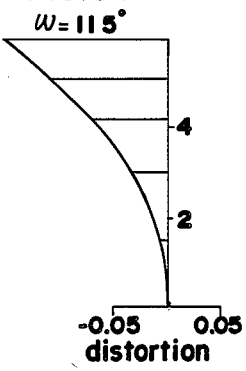
Figure 6A:
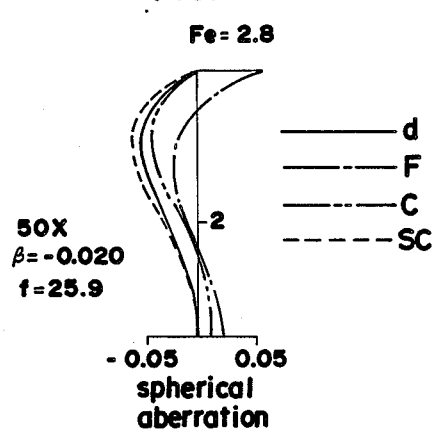
FIGS. 6a to 6c are diagrams showing aberrations curves of the first embodiment at 50×.
Figure 6B:
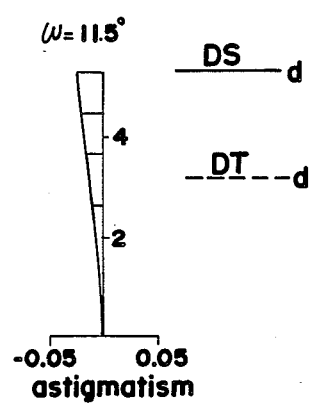
Figure 6C:
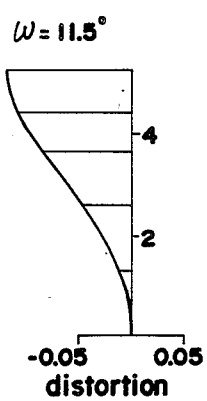
Figure 12A:
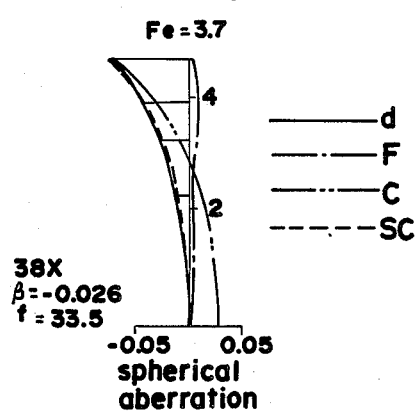
FIGS. 12a to 12c are diagrams showing aberration curves of the third embodiment at 38×.
Figure 12B:
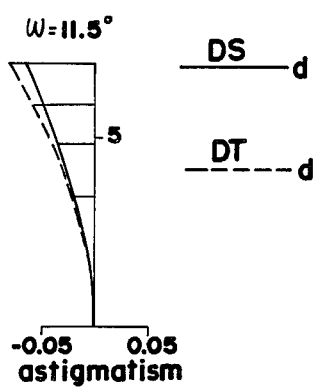
Figure 12C:
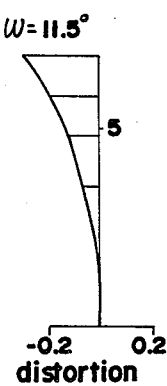
Figure 13A:
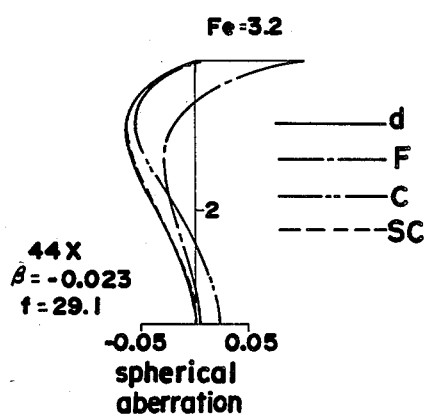
FIGS. 13a to 13c are diagrams showing aberration curves of the third embodiment at 44×.
Figure 13B:
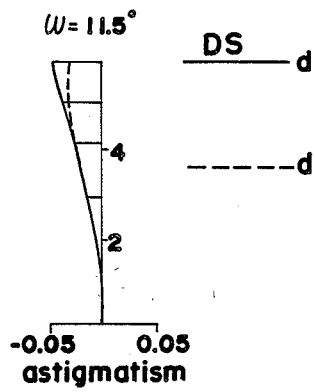
Figure 13C:
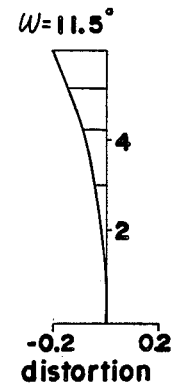
Figure 14A:
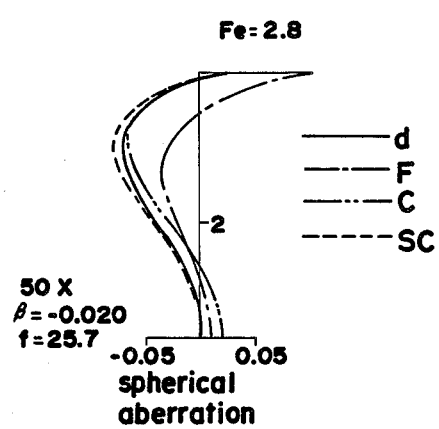
FIGS. 14a to 14c are diagrams showing aberration curves of the third embodiment at 50×.
Figure 14B:
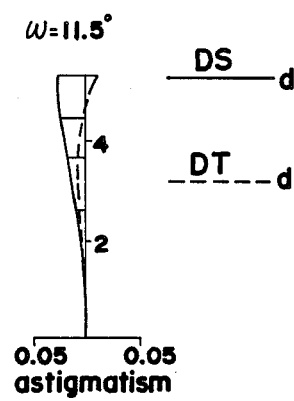
Figure 14C:
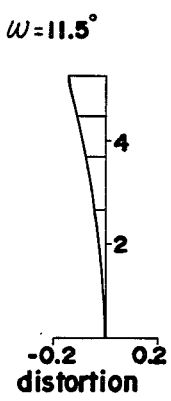

The following tables 1, 2 and 3 disclose, respectively, the first, second and third embodiments of the present invention. The first and second embodiment are similar in configuration to those shown in FIGS. 3 and 7, respectively, but have different numerical values. The third embodiment is different from the first and second embodiments in the configuration of the first lens group. Referring to FIG. 11, the third embodiment has two positive lenses as the enlargement side positive lens unit instead of the positive lens L1 shown in FIGS. 2a and 2b.

In the tables, S is the aperture stop, d is the axial distance which includes three sets of values corresponding to the lateral magnifications $-0.026$, $-0.023$, $-0.020$, respectively.

TABLE 1 effective F number = 3.7 to 3.2 to 2.8
f = 33.8 to 29.3 to 25.9

| | radius of curvature | axial distance | | refractive index Nd | Abbe number $\nu$ d | |
|---|---|---|---|---|---|---|
| | | $\beta = -0.026 \sim -0.023 \sim -0.020$ | | | | |
| $r_1$ | 25.510 | | | | | |
| | | $d_1$ | 3.500 | $N_1$ 1.83400 | $\nu_1$ | 37.05 |
| $r_2$ | $-92.188$ | | | | | |
| | | $d_{2-1}$ | 0.000 | | | |
| S | | | | | | |
| | | $d_{2-2}$ | 2.000 | | | |
| $r_3$ | $-14.978$ | | | | | |
| | | $d_3$ | 1.800 | $N_2$ 1.72100 | $\nu_2$ | 33.40 |
| $r_4$ | 31.200 | | | | | |
| | | $d_4$ | 2.500 | | | |
| $r_5$ | $-104.566$ | | | | | |
| | | $d_5$ | 2.500 | $N_3$ 1.71300 | $\nu_3$ | 53.93 |
| $r_6$ | $-16.265$ | | | | | |
| | | $d_6$ | 0.100 | | | |
| $r_7$ | 49.696 | | | | | |
| | | $d_7$ | 1.000 | $N_4$ 1.67339 | $\nu_4$ | 29.25 |
| $r_8$ | 13.787 | | | | | |
| | | $d_8$ | 4.300 | $N_5$ 1.65830 | $\nu_5$ | 58.52 |
| $r_9$ | $-27.797$ | | | | | |
| | | $d_9$ | $3.200 \sim 5.857 \sim 8.516$ | | | |
| $r_{10}$ | $-24.367$ | | | | | |
| | | $d_{10}$ | 2.000 | $N_6$ 1.80518 | $\nu_6$ | 25.43 |
| $r_{11}$ | $-16.128$ | | | | | |
| | | $d_{11}$ | 3.000 | | | |
| $r_{12}$ | $-14.036$ | | | | | |
| | | $d_{12}$ | 1.100 | $N_7$ 1.71700 | $\nu_7$ | 47.86 |
| $r_{13}$ | 15.154 | | | | | |
| | | $d_{13}$ | 0.0335 | | | |
| $r_{14}$ | 15.256 | | | | | |
| | | $d_{14}$ | 2.600 | $N_8$ 1.67100 | $\nu_8$ | 51.73 |
| $r_{15}$ | 318.607 | | | | | |
| | | $d_{15}$ | $13.454 \sim 7.322 \sim 2.642$ | | | |
| $r_{16}$ | $\infty$ | | | | | |
| | | $d_{16}$ | 3.000 | | | |
| $r_{17}$ | $\infty$ | | | | | |

$\Sigma d = 46.914 \sim 42.914 \sim 40.893$
$fI/fL = 0.6247$  $fII/fL = -0.8257$
$|rA/rB| = 20.884$
$\sqrt{\nu A \cdot \nu C}/\nu B = 0.753$

TABLE 2 effective F number = 3.7 to 3.2 to 2.8
f = 33.5 to 29.1 to 25.7

| | radius of curvature | axial distance | | refractive index Nd | Abbe number $\nu$ d | |
|---|---|---|---|---|---|---|
| | | $\beta = -0.026 \sim -0.023 \sim -0.020$ | | | | |
| $r_1$ | 22.260 | | | | | |
| | | $d_1$ | 3.500 | $N_1$ 1.80700 | $\nu_1$ | 39.71 |
| $r_2$ | $-158.905$ | | | | | |
| | | $d_{2-1}$ | 0.100 | | | |
| S | | | | | | |
| | | $d_{2-2}$ | 1.900 | | | |
| $r_3$ | $-14.947$ | | | | | |
| | | $d_3$ | 1.835 | $N_2$ 1.68300 | $\nu_2$ | 32.07 |
| $r_4$ | 28.437 | | | | | |
| | | $d_4$ | 2.500 | | | |
| $r_5$ | $-83.468$ | | | | | |
| | | $d_5$ | 2.500 | $N_3$ 1.70800 | $\nu_3$ | 53.23 |
| $r_6$ | $-15.990$ | | | | | |
| | | $d_6$ | 0.100 | | | |
| $r_7$ | 41.979 | | | | | |
| | | $d_7$ | 0.700 | $N_4$ 1.67339 | $\nu_4$ | 29.25 |
| $r_8$ | 13.808 | | | | | |

TABLE 2-continued effective F number = 3.7 to 3.2 to 2.8
f = 33.5 to 29.1 to 25.7

| | radius of curvature | | axial distance | refractive index Nd | | Abbe number $\nu$ d | |
|---|---|---|---|---|---|---|---|
| | | $d_8$ | 2.446 | $N_5$ 1.65890 | $\nu_5$ | 56.41 | |
| $r_9$ | −30.793 | | | | | | |
| | | $d_9$ | 2.640~5.471~8.314 | | | | |
| $r_{10}$ | −24.481 | | | | | | |
| | | $d_{10}$ | 1.800 | $N_6$ 1.80518 | $\nu_6$ | 25.43 | |
| $r_{11}$ | −16.348 | | | | | | |
| | | $d_{11}$ | 3.032 | | | | |
| $r_{12}$ | −14.624 | | | | | | |
| | | $d_{12}$ | 1.118 | $N_7$ 1.71700 | $\nu_7$ | 47.86 | |
| $r_{13}$ | 15.297 | | | | | | |
| | | $d_{13}$ | 0.465 | | | | |
| $r_{14}$ | 15.520 | | | | | | |
| | | $d_{14}$ | 2.110 | $N_8$ 1.67100 | $\nu_8$ | 51.73 | |
| $r_{15}$ | 571.271 | | | | | | |
| | | $d_{15}$ | 14.900~8.325~3.283 | | | | |
| $r_{16}$ | ∞ | | | | | | |
| | | $d_{16}$ | 3.000 | | | | |
| $r_{17}$ | ∞ | | | | | | |

$\Sigma d = 44.646 \sim 40.901 \sim 38.703$
$fI/fL = 0.6219$   $fII/fL = -0.8404$
$|rA/rB| = 36.808$
$\sqrt{\nu A \cdot \nu C} / \nu B = 0.758$

TABLE 3 effective F number = 3.7 to 3.2 to 2.8
f = 33.5 to 29.1 to 25.7

| | radius of curvature | | axial distance | refractive index Nd | | Abbe number $\nu$ d | |
|---|---|---|---|---|---|---|---|
| | | $\beta =$ | −0.026~−0.023~−0.020 | | | | |
| $r_1$ | 16.763 | | | | | | |
| | | $d_1$ | 1.000 | $N_1$ 1.75450 | $\nu_1$ | 32.83 | |
| $r_2$ | 46.879 | | | | | | |
| | | $d_2$ | 0.200 | | | | |
| $r_3$ | 35.410 | | | | | | |
| | | $d_3$ | 1.200 | $N_2$ 1.75450 | $\nu_2$ | 32.83 | |
| $r_4$ | 67.224 | | | | | | |
| | | $d_{4-1}$ | 0.250 | | | | |
| S | | | | | | | |
| | | $d_{4-2}$ | 1.600 | | | | |
| $r_5$ | −14.829 | | | | | | |
| | | $d_5$ | 1.820 | $N_3$ 1.68300 | $\nu_3$ | 31.52 | |
| $r_6$ | 20.873 | | | | | | |
| | | $d_6$ | 1.650 | | | | |
| $r_7$ | 61.272 | | | | | | |
| | | $d_7$ | 2.500 | $N_4$ 1.67790 | $\nu_4$ | 55.38 | |
| $r_8$ | −15.239 | | | | | | |
| | | $d_8$ | 0.100 | | | | |
| $r_9$ | 37.048 | | | | | | |
| | | $d_9$ | 0.700 | $N_5$ 1.67339 | $\nu_5$ | 29.25 | |
| $r_{10}$ | 12.837 | | | | | | |
| | | $d_{10}$ | 2.450 | $N_6$ 1.60311 | $\nu_5$ | 60.69 | |
| $r_{11}$ | −32.955 | | | | | | |
| | | $d_{11}$ | 2.640~4.875~7.119 | | | | |
| $r_{12}$ | −18.198 | | | | | | |
| | | $d_{12}$ | 1.800 | $N_7$ 1.60518 | $\nu_7$ | 25.43 | |
| $r_{13}$ | −13.275 | | | | | | |
| | | $d_{13}$ | 3.000 | | | | |
| $r_{14}$ | −11.666 | | | | | | |
| | | $d_{14}$ | 1.480 | $N_8$ 1.72000 | $\nu_8$ | 52.14 | |
| $r_{15}$ | 18.520 | | | | | | |
| | | $d_{15}$ | 0.280 | | | | |
| $r_{16}$ | 17.775 | | | | | | |
| | | $d_{16}$ | 2.100 | $N_9$ 1.66608 | $\nu_9$ | 47.95 | |
| $r_{17}$ | −226.050 | | | | | | |
| | | $d_{17}$ | 14.200~8.310~3.797 | | | | |
| $r_{18}$ | ∞ | | | | | | |
| | | $d_{28}$ | 3.000 | | | | |
| $r_{19}$ | ∞ | | | | | | |

$\Sigma d = 41.975 \sim 38.320 \sim 36.051$
$fI/fL = 0.5492$   $fII/fL = -0.7063$
$|rA/rB| = -14.968$
$\sqrt{\nu A \cdot \nu C} / \nu B = 0.670$

What is claimed is: A zoom lens system comprising from the enlargement side to the reduction side:

a first lens group of a positive refractive power having an aperture stop and being movable along the optical axis in an operation of zooming, the first lens group including, from the enlargement side, a positive lens unit having at least one positive lens element, a biconcave lens element, a positive lens element and a positive compound lens unit composed of a negative lens element and a positive lens element cemented together; and a second lens group of a negative refractive power being movable along the optical axis in the operation of zooming, the second lens group including, from the enlargement side, a positive meniscus lens element having a concave surface on the enlargement side, a biconcave lens element and a positive lens element.

2. A zoom lens system as claimed in claim 1, wherein the first lens group with the aperture stop and the second lens group are moved to the reduction side along the optical axis while increasing the distance between the first and second lens groups in an operation of zooming from the longest focal length side to the shortest focal length side.

3. A zoom lens system as claimed in claim 1, wherein an aperture stop is integrally mounted in the first lens group.

4. A zoom lens system as claimed in claim 1, wherein an aperture stop is disposed between the positive lens unit and the biconcave lens element of the first lens group.

5. A zoom lens system comprising from the enlargement side to the reduction side:

a first lens group of a positive refractive power having an aperture stop and being movable along the optical axis in an operation of zooming, the first lens group including, from the enlargement side, a positive lens unit having at least one positive lens element, a biconcave lens element, a positive lens element and a positive compound lens unit composed of a negative lens element and a positive lens element cemented together; and a second lens group of a negative refractive power being movable along the optical axis in the operation of zooming, the second lens group including, from the enlargement side, a positive meniscus lens element having a concave surface on the enlargement side, a biconcave lens element and a positive lens element;

wherein the system fulfills the following conditions:

$0.5 f_L < f_I < 0.7 f_L$
$-0.9 f_L < f_{II} < -0.06 f_L$
$10.0 < |r_A / r_B|$
$0.6 < \sqrt{\nu_A \cdot \nu_C / \nu_B} < 0.8$ wherein $f_L$ is a focal length of the system at the longest focal length side, $f_I$ is a focal length of the first lens group, $f_{II}$ is a focal length of the second lens group, $r_A$ is a radius of curvature of the reduction side surface for the positive lens element of the second leng group, $r_B$ is a radius of curvature of the enlargement side surface for the positive lens element of the second lens groups, $\nu_A$ is an Abbe number for the positive meniscus lens of the second lens group, $\nu_B$ is an Abbe number for the biconcave lens of the second lens group and $\nu_C$ is an Abbe number for the positive lens of the second lens group.

6. A microfilm projection apparatus in which an image recorded on a microfilm is projected onto a screen at a condition of a definite object-image distance, the apparatus comprising:

a zoom lens system comprising a positive lens group at the enlargement side and a negative lens group at the reduction side, the positive lens group having an aperture stop and being movable along the optical axis in an operation of zooming, the positive lens group including, from the enlargement side, a positive lens unit having at least one positive lens element, a biconcave lens element, a positive lens element and a positive compound lens unit composed of a negative lens element, and a positive lens element cemented together, the negative lens group being movable along the optical axis in the operation of zooming, the negative lens group including, from the enlargement side, a positive meniscus lens element having a concave surface on the enlargement side, a biconcave lens element and a positive lens element; and an image rotation prism being located at the enlargement side of the zoom lens system for optically rotating an image on the screen without moving the microfilm.

7. A microfilm projection apparatus as claimed in claim 6, wherein the positive lens group with the aperture stop and the negative lens group are moved to the reduction side along the opical axis while increasing the distance between the positive and negative lens groups in an operation of zooming from the longest focal length side to the shortest focal length side.

8. A microfilm projection apparatus as claimed in claim 6, wherein the aperture stop is integrally mounted in the positive lens group.

9. A microfilm projection apparatus as claimed in claim 6, wherein the aperture stop is disposed between the positive lens unit and the biconcave lens element of the positive lens group.

10. A microfilm projection apparatus in which an image recorded on a microfilm is projected onto a screen at a condition of a definite object-image distance, the apparatus comprising:

a zoom lens system comprising a positive lens group at the enlargement side and a negative lens group at the reduction side, the positive lens group having an aperture stop and being movable along the optical axis in an operation of zooming, the positive lens group including, from the enlargement side, a positive lens unit having at least one positive lens element, a biconcave lens element, a positive lens element and a positive compound lens unit composed of a negative lens element and a positive lens element cemented together;

the negative lens group being movable along the optical axis in the operation of zooming, the negative lens group including, from the enlargement side, a positive meniscus lens element having a concave surface on the enlargement side, a biconcave lens element and a positive lens element; and an image rotation prism being located at the enlargement side of the zoom lens system for optically rotating an image on the screen without moving the microfilm;

wherein the zoom lens system fulfills the following conditions:

$0.5f_L < f_I < 0.7f_L$
$-0.9f_L < f_{II} < -0.6f_L$
$10.0 < |r_A/r_B|$
$0.6 < \sqrt{\nu_A \cdot \nu_C / \nu_B} < 0.8$ wherein $f_L$ is a focal length of the system at the longest focal length side, $f_I$ is a focal length of the positive lens group, $f_{II}$ is a focal length of the negative lens group $r_A$ is a radius of curvature of the reduction side surface for the positive lens element of the negative lens group, $r_B$ is a radius of curvature of the enlargement side surface for the positive lens element of the negative lens group, $\nu_A$ is an Abbe number for the positive meniscus lens of the negative lens group, $\nu_B$ is an Abbe number for the biconcave lens of the negative lens group and $\nu_C$ is an Abbe number for the positive lens of the negative lens group.

* * * * *